United States Patent
Krishnamurthy et al.

(10) Patent No.: US 9,497,068 B1
(45) Date of Patent: Nov. 15, 2016

(54) PERSONAL ANALYTICS AND USAGE CONTROLS

(71) Applicant: Google Inc., Mountain View, CA (US)

(72) Inventors: Swaminathan Krishnamurthy, San Jose, CA (US); Nick Salvatore Arini, Southampton (GB)

(73) Assignee: Google Inc., Mountain View, CA (US)

( * ) Notice: Subject to any disclaimer, the term of this patent is extended or adjusted under 35 U.S.C. 154(b) by 415 days.

(21) Appl. No.: 13/844,043

(22) Filed: Mar. 15, 2013

(51) Int. Cl.
*G06F 15/177* (2006.01)
*H04L 12/24* (2006.01)
*H04L 29/06* (2006.01)
*G06F 11/34* (2006.01)

(52) U.S. Cl.
CPC ............ *H04L 41/00* (2013.01); *G06F 11/34* (2013.01); *H04L 63/10* (2013.01)

(58) Field of Classification Search
CPC ............ H04L 29/06; H04L 29/08072; H04L 29/0809; H04L 29/08144; H04L 63/08; H04L 63/10; G06F 11/34
USPC .................................. 709/223–225, 220
See application file for complete search history.

(56) References Cited

U.S. PATENT DOCUMENTS

| | | | |
|---|---|---|---|
| 6,233,618 B1 | 5/2001 | Shannon | |
| 6,389,475 B1 | 5/2002 | Speakman et al. | |
| 7,752,329 B1* | 7/2010 | Meenan | H04L 12/66 709/217 |
| 7,953,087 B1 | 5/2011 | Bollay et al. | |
| 8,085,774 B2 | 12/2011 | Donahue | |
| 8,307,068 B2* | 11/2012 | Schuler | 709/224 |
| 8,843,953 B1* | 9/2014 | Dang | H04N 21/44204 725/28 |
| 2004/0117852 A1* | 6/2004 | Karaoguz | H04N 7/163 725/134 |
| 2004/0158631 A1* | 8/2004 | Chang et al. | 709/224 |
| 2004/0260801 A1* | 12/2004 | Li | H04L 12/585 709/223 |
| 2005/0108383 A1* | 5/2005 | DeHaas et al. | 709/224 |
| 2006/0015580 A1* | 1/2006 | Gabriel | H04N 7/17309 709/219 |
| 2006/0242306 A1* | 10/2006 | Boro | G06F 21/62 709/227 |
| 2007/0055754 A1* | 3/2007 | Robbin | G07F 17/16 709/223 |
| 2007/0183746 A1* | 8/2007 | Haeuser | H04N 5/76 386/214 |
| 2007/0245398 A1* | 10/2007 | Roden | H04N 5/4403 725/133 |
| 2008/0092181 A1* | 4/2008 | Britt | H04N 7/1675 725/87 |
| 2008/0141294 A1* | 6/2008 | Leichter | H04N 7/163 725/28 |
| 2008/0148310 A1* | 6/2008 | Strickland | G06F 17/30867 725/30 |
| 2008/0209057 A1 | 8/2008 | Martini et al. | |
| 2009/0029693 A1* | 1/2009 | Liwell | H04L 12/585 455/419 |
| 2009/0157889 A1* | 6/2009 | Treuhaft | H04L 29/12066 709/230 |
| 2009/0279492 A1* | 11/2009 | Montemurro | H04L 63/083 370/329 |
| 2010/0191834 A1* | 7/2010 | Zampiello | G06F 17/30867 709/220 |
| 2010/0303087 A1* | 12/2010 | Miao | H04L 12/5695 370/401 |
| 2011/0235549 A1* | 9/2011 | Ahlers | H04L 41/08 370/255 |
| 2011/0292938 A1* | 12/2011 | Harp | G06F 17/30867 370/392 |
| 2012/0030276 A1* | 2/2012 | Narayanan et al. | 709/203 |
| 2012/0239663 A1 | 9/2012 | Tzruya et al. | |
| 2013/0086634 A1* | 4/2013 | Dee | H04L 63/0876 726/3 |
| 2013/0103660 A1* | 4/2013 | Welsh | H04L 12/2812 707/705 |
| 2014/0115354 A1* | 4/2014 | Jabbaz | H04L 12/10 713/310 |

* cited by examiner

*Primary Examiner* — Imad Hussain
(74) *Attorney, Agent, or Firm* — Foley & Lardner LLP; John D. Lanza

(57) ABSTRACT

A usage control and data logging method, executed by a processor, includes receiving a request to configure a set of usage rules for a household; generating and storing a usage control rule set; receiving a report of Internet activity; reconstructing, by the processor, actual Internet usage from the report; tagging, by the processor, Web pages and content items accessed during the Internet activity; and aggregating the Internet activity usage into a personal analytics report.

20 Claims, 7 Drawing Sheets

PERSONAL ANALYTICS AND USAGE CONTROLS

BACKGROUND

Media may be supplied by media providers to consumers of that media using a variety of delivery paths and mechanisms. Such media may include broadcast television programs, video programs streamed, for example, over the Internet, static Internet content, and other programs and content. Such media also may include sponsored events that are served during the display of the media. The sponsored events that accompany the media may in some way relate to the media. Media and accompanying sponsored events may be accessed using mobile or fixed media devices.

The proliferation of media and media delivery mechanism may raise some concerns about exposure of certain individual, and particularly children, to certain media. Thus, many delivery systems and media devices include parental control features that, when implemented may protect children from misusing the media delivery system (e.g., the Internet) or being exposed to inappropriate content. These controls are increasingly powerful but are currently client specific.

SUMMARY

A usage control and data logging method, executed by a processor, includes receiving a request to configure a set of usage rules for a household; generating and storing a usage control rule set; receiving a report of Internet activity; reconstructing, by the processor, actual Internet usage from the report; tagging, by the processor, Web pages and content items accessed during the Internet activity; and aggregating the Internet activity usage into a personal analytics report.

A processor implemented method for controlling access to Internet Web sites includes generating and storing, at a local network gateway, a set of Internet access and data logging rules; applying the Internet access rules to media devices based on identifications of the media devices; applying the Internet access rules based on an identification of a media device user; and when the Internet access rules permit access, logging, at the local network gateway, resulting Internet activity data.

DESCRIPTION OF THE DRAWINGS

The detailed description refers to the following Figures in which like numerals refer to like items, and in which.

DETAILED DESCRIPTION

Figure 1:
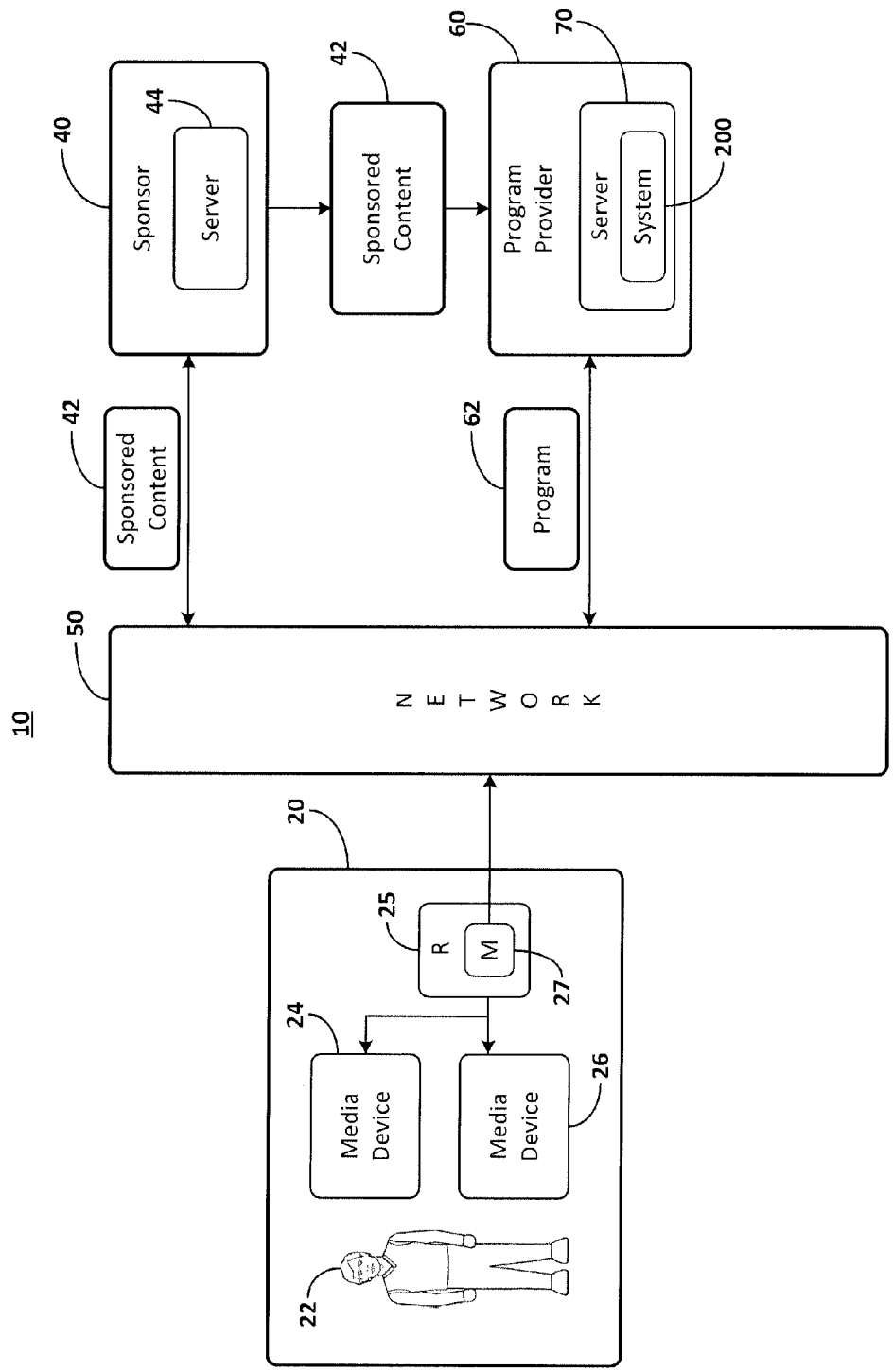
FIG. 1 illustrates an example environment in which personal analytics and usage controls may be implemented.

Media providers deliver media to consumers using a variety of delivery paths and mechanisms. Such media may include broadcast television programs, video programs streamed over the Internet, other Web site content, and radio, for example. Such media also may include sponsored events that are served during the display of the media. The sponsored events that accompany the media may in some way relate to the media. Media and accompanying sponsored events may be accessed using mobile or fixed media devices. Some of this media may not be appropriate for young people.

Sponsors provide sponsored events to promote products and services. Sponsors may use one or more different media distribution channels (e.g., television, radio, print, online) to promote the products and services. Sponsors may create a promotional campaign that uses sponsored events appearing in different media. The sponsored events may be for the same products and services although the sponsored events appear in different media. However, as with media in general, some sponsored content may not be appropriate for young people.

Parental controls are important to protect young people from misusing the Internet or being exposed to inappropriate content. These controls are increasingly powerful but currently are client specific. To provide effective protection, all media devices may need to be subject to parental controls. This broad coverage is increasingly difficult to achieve as more and different types of media devices connect to the Internet. In addition these media devices do not necessarily communicate with each other, and so holistic protection is not possible. Furthermore, parents may be unable to effectively or correctly set up many different types of parental controls from different vendors and on different media devices. At best, achieving broad parental controls may be burdensome. Finally, there is no way to get a simple combined report on overall activity across devices to allow usage to be monitored.

To overcome the above-noted problems with current parental control systems, disclosed herein are personal analytics and control systems and methods. In one aspect, in the context of Internet access, the systems use a meter or data logger installed, for example, on a router, which logs Internet activity passing through the router. The systems and methods involve a monitoring system that may be combined with server-side analysis (pagination, content categorization, disambiguation) to produce a set of measurements that may be presented to a "manager" (e.g., a parent) of a household Internet connection. The systems and methods then allow the Internet manager to set up parental control rules that are informed by existing Internet activity, and which can be managed for all household usage, regardless of media device, and which further, may be informed by broad content categories.

In an embodiment, a personal analytics and usage control and monitoring system is implemented using an application installed on an application-enabled router, and a server-based interface for accessing and configuring the usage controls. In an alternative, the interface may be implemented locally. In another embodiment, the interface may be implemented locally using a browser on a local media device, for example.

The herein disclosed systems include a logging engine that may be installed on a local router or gateway. The systems further include a pagination engine, which reconstructs the actual usage from a stream of raw requests, a categorization engine, which takes individual Web page views and content item accesses and tags them with metadata to enable powerful reporting and parental controls to be applied (this also would involve flagging potentially malicious sites and content and adult content); a reporting engine which aggregates the usage in to a form which is easily consumed; an interface engine, which reports the usage and presents controls to allow for blocking and restriction of individual Web sites as well as categories of content, setting time limits on usage (absolute and/or time of day), monitoring overall usage (Internet-based television watching, gaming, surfing); a white listing engine that identifies certain content (to allow unrestricted study); an alerting engine, and a rules enforcement engine. Some of the above-listed components may be implemented only on the router; and some components may be implemented on either the router or a remote server.

Although the disclosed systems are described primarily with respect to Internet access control and data logging, the systems may be applied to control and log data related to other media including, for example, broadcast television.

In an embodiment, consumption of Internet-based content is monitored and controlled. However, the systems and methods also may apply to broadcast television and associated television advertisements. However, other media, including specific aspects of television viewing may be of interest. For example, such media may include: a particular broadcast of a television program, a particular television channel or network, associated sponsored content segments, video on-demand, digital video recordings, or television in general; radio, such as a particular radio program, a particular radio station, or radio in general; the Internet, such as a particular Web site(s) or a genre of Web sites, as well as videos, audios, and sponsored content segments, including clickable sponsored content segments; print media, including newspapers; magazines, periodical publications, and books; outdoor sponsored content, such as billboards and signage; movie theater presentations, including pre-show sponsored content segments, trailers and product placements; in-store shopping, including interactive kiosks in shopping malls and centers; text messaging over smart phones; voice modules provided over telephones including land line phones and mobile phones; e-mail transmissions; and games, including computer games and Internet-based or online games.

FIG. 1 illustrates an example environment in which personal analytics and usage controls may be implemented. In FIG. 1, environment 10 includes viewing locations 20, sponsor 40, and program provider 60, all of which communicate using communications network 50. Although FIG. 1 shows these entities as separate and apart, at least some of the entities may be combined or related. For example, the sponsor 40 and program provider 60 may be part of a single entity. Other combinations of entities are possible.

The viewing location 20 includes first media device 24 and second media device 26 through which viewers 22 are exposed to media from sponsor 40 and program provider 60. A viewing location 20 may be the residence of the viewer 22, who operates media devices 24 and 26 to access, through router 25, resources such as Web sites and to receive television programs, radio programs, and other media. The media devices 24 and 26 may be fixed or mobile. For example, media device 24 may be an Internet connected "smart" television (ITV); a "basic" or "smart" television connected to a set top box (STB) or other Internet-enabled device; a Blu-ray™ player; a game box; and a radio, for example. Media device 26 may be a tablet, a smart phone, a laptop computer, or a desk top computer, for example. The media devices 24 and 26 may include browsers. A browser may be a software application for retrieving, presenting, and traversing resources such as at the Web sites. The browser may record certain data related to the Web site visits. The media devices 24 and 26 also may include applications. The viewer 22 may cause the media devices 24 or 26 to execute an application, such as a mobile banking application, to access online banking services. The applications may involve use of a browser or other means, including cellular means, to connect to the online banking services.

The viewing location 20 may include a monitor 27 that records and reports data collected during exposure of sponsored content segments 42 and programs 62 to the viewer 22. The example monitor 27 may be incorporated into router 25 through which certain media (e.g., Internet-based content) received at the viewing location 20 passes.

The sponsor 40 operates server 44 to provide sponsored content segments that are served with programs 62 provided by the program provider 60. For example, the server 44 may provide sponsored content segments to serve with broadcast television programming. The sponsored content segments 42 may include audio, video, and animation features. The sponsored content segments 42 may be in a rich media format. The sponsor 40 may provide a promotional campaign that includes sponsored content segments to be served across different media types or a single media type. The cross-media sponsored content segments 42 may be complementary; that is, related to the same product or service.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the program provider 60 and the media devices 24 and 26. While illustrated as a single or continuous network, the network 50 may be divided logically into various sub-nets or virtual networks, so long as at least a portion of the network 50 may facilitate communications among the entities of FIG. 1A.

The program provider 60 delivers programs for consumption by the viewer 22. The programs 62 may be broadcast television programs. Alternately, the programs 62 may be radio programs, Internet Web sites, or any other media. The programs 62 include provisions for serving and displaying sponsored content segments 42. The program provider 60 may receive the sponsored content segments 42 from the sponsor and incorporate the sponsored content segments into the programs 62. Alternately, the viewer's media devices may request a sponsored content segment 42 when those media devices display a program 62.

The program provider 60 operates server 70 to serve programs and to implement usage control system 200. The system 200 may collect information related to programs 62 displayed at the media devices 24 and 26. The system 200 may provide an interface that allows the viewer 22 to establish usage controls.

In executing the processes of FIG. 1, and as otherwise disclosed herein, individual viewer and household demographic data, Internet activity, and television viewing data, for example, may be collected and used. In situations in which the systems disclosed herein may collect and/or use personal information about viewers, or may make use of personal information, the viewers may be provided with an opportunity to control whether programs or features collect viewer information (e.g., information about a viewer's social network, social actions or activities, profession, a viewer's preferences, or a viewer's current location), or to control whether and/or how to receive media, including advertisements, from an server that may be more relevant or of interest to the viewer. In addition, certain data may be treated in one or more ways before it is stored or used, so that personally identifiable information is removed. For example, a viewer's identity may be treated so that no personally identifiable information can be determined for the viewer, or a viewer's geographic location may be generalized where location information is obtained (such as to a city, ZIP code, or state level), so that a particular location of a viewer cannot be determined. Thus, the viewer may have control over how information is collected about the viewer and used by a server.

Figure 2A:
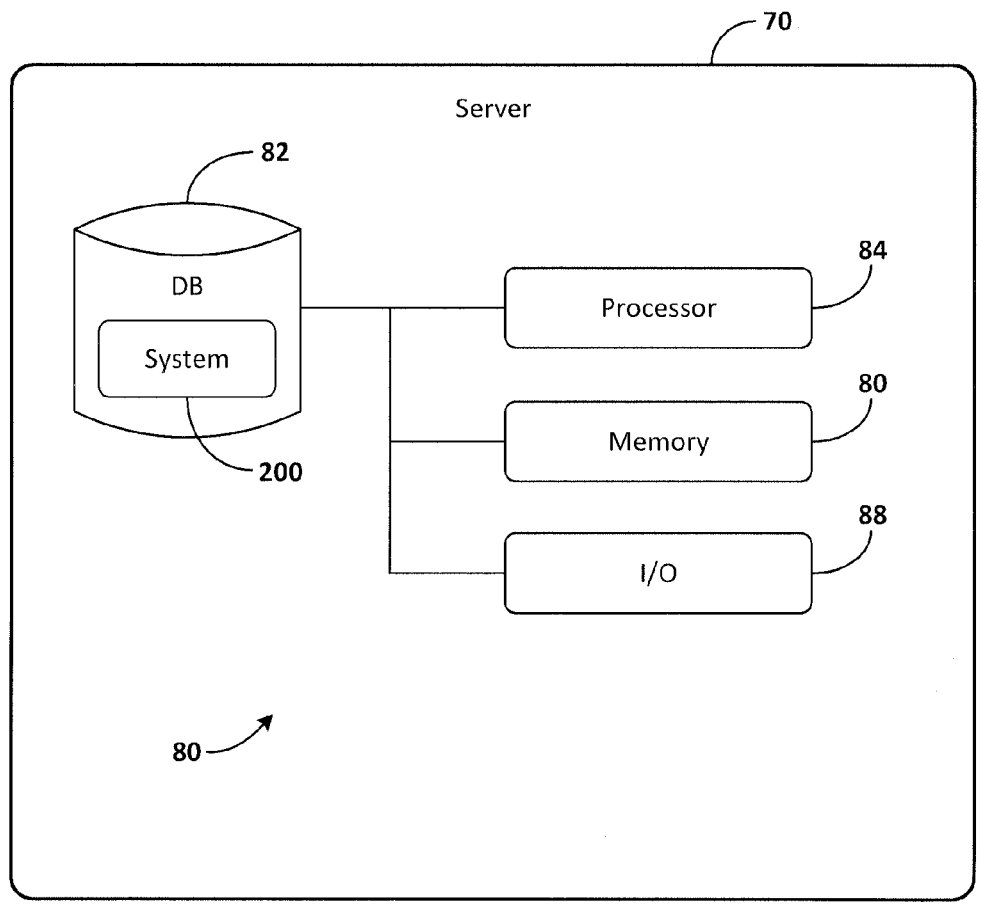
FIG. 2A illustrates an example personal analytics and usage controls system.

FIG. 2A illustrates an example personal analytics and usage controls system. In FIG. 2A, system 80 is implemented on remote server 70 and includes database 82, processor 84, memory 86, and input/output (I/O) 88.

The database 82 includes a non-transitory computer-readable storage medium on which is encoded the machine instructions comprising the system 200 (see FIG. 2B) and other programming 87 needed to provide the services of the program provider 60. The processor 84 loads the machine instructions into memory 86 and executes the machine instructions to provide personal analytics and usage controls functions. The I/O 88 allows the server 70 to communicate with other entities such as the server 44.

Figure 2B:
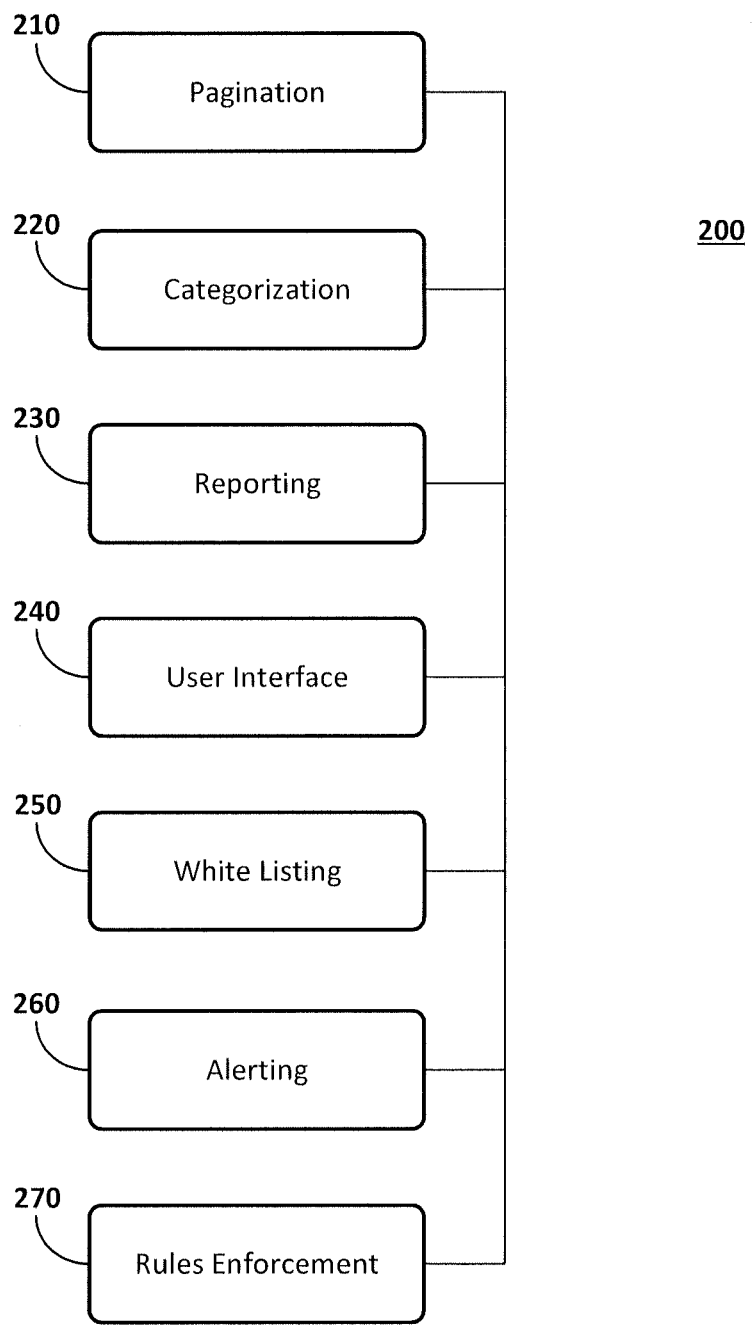
FIG. 2B illustrates example components of a personal analytics and usage controls system implemented on the system of FIG. 2A.

FIG. 2B illustrates example components of a personal analytics and usage controls system implemented on the remote server 70 of FIG. 2A. In FIG. 2B, system 200 includes pagination engine 210, categorization engine 220, reporting engine 230, user interface engine 240, white listing engine 250, alerting engine 260, and rules enforcement engine 270. Certain of these components communicate with rules and data logging database 280.

The pagination engine 210 reconstructs actual Internet usage from a stream of Internet activity data received from the router 25. The actual Internet usage may form an input to the rules enforcement engine 270 and to the reporting engine 230.

The categorization engine 220 takes individual Web page views and content accesses and tags them with metadata to enable reporting and parental controls to be applied. The categorization engine 220 also may flag potentially malicious Web sites and Web sites having restricted content.

The reporting engine 230 aggregates the Internet activity usage into a form that is easily consumed by the viewer 22.

The user interface (UI) engine 240 reports the usage and presents control panel Controls: allow for blocking and restriction of individual sites as well as categories of content, setting time limits on usage (absolute and/or time of day). Monitoring overall usage (TV watching, gaming, surfing).

The white listing engine 250 identifies certain content (to allow unrestricted study, for example) such as an online encyclopedia.

The alerting engine 260 provides indications when a limit (e.g., allowed Mb per day) is approached or reached, or when a media device or viewer attempts to access a restricted Web site, or attempts to access a Web site outside an allowed time frame (e.g., after 10 pm). The alerting engine 260 may provide alerts in the form of a text message on a supervising (e.g. patent's) smartphone.

The rules enforcement engine 270 may operate to block or prevent Internet access whenever a media device or logged in viewer initiates an action that violates any of the rules.

The rules and data logging database 280 includes a viewer-created set of usage control rules. The database 280 may include identities of malicious Web sites. The database 280 may include a section recording viewer Internet activity. The data may be organized by each viewer in a household. Alternately, or in addition, the database 280 may store aggregated Internet activity for the household. In a further alternative, the system 200 may aggregate the individual viewer data on demand from the parent viewer.

Figure 3:
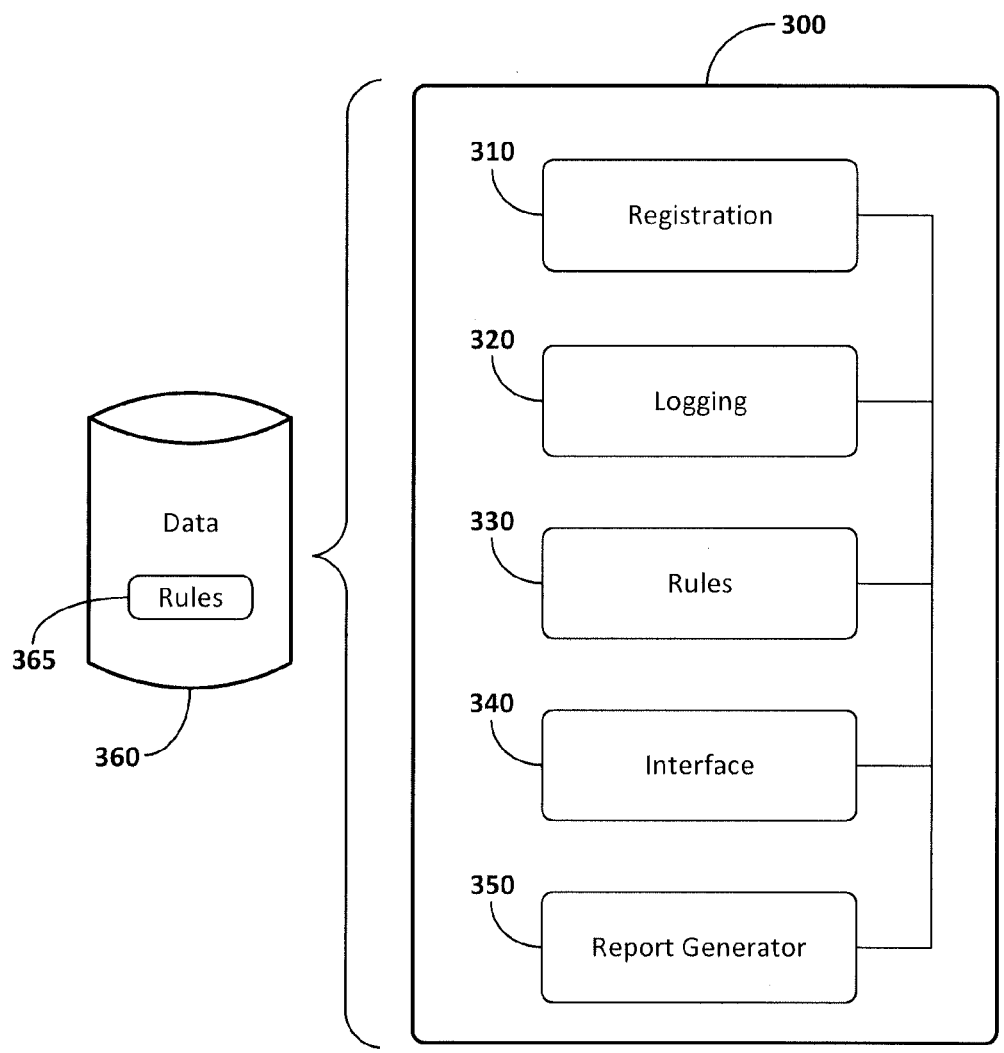
FIG. 3 illustrates example components of a personal analytics and usage controls system as implemented locally.

FIG. 3 illustrates example components of a personal analytics and usage controls system as implemented on a local (e.g., in-home) router. In FIG. 3, system 300 includes registration engine 310, logging engine 320, rules engine 330, interface engine 340, and report generator 350. The system 300 may be stored in non-transitory computer-readable storage medium 360.

The system 300 may be executed by a processor (not shown) installed with the router 25. Alternately, processors in each of the media devices may consult the rules established by the system 300 to determine if Internet access is permitted.

The registration engine 310 allows media devices within the home to be registered with the router so that usage controls may be enforced (if applicable), and Internet activity data logged for each media device. The registration engine also allows individual viewers in the household to register a user identification and password. Individual viewer registration may be desired when the household includes shared media devices. Individual registration also may be desired to prevent or limit access by guests and guest media devices.

The logging engine 320 captures Internet traffic. In an embodiment, the logging engine 320 sends a report of the Internet traffic to the server 70. In another embodiment, the data are retained at the router.

The rules engine 330 allows a viewer in the household (presumably a parent or head of household) to establish usage controls and data logging requirements. The data logging requirements instructs the router as to what data are to be logged, and if retained in the router, how the data are to be formatted and displayed. For example, the router may be instructed to display household (aggregated) usage data in terms of Mb per day.

The interface engine 340 provides a mechanism whereby a viewer 22 may establish, view, and revise a rules data set that controls Internet access for all media devices operating at the viewing location 20.

The report generator 350 uses logged Internet activity to generate an activity report viewers at the viewing location 20. The report may be customized to support the needs of the viewers 22.

Table 1 below illustrates an example of rules that may be established in the router 25 and applied at a household level. In Table 1, the example rules are include content-based restrictions (e.g., content type, specific Web sites) time of day restrictions (e.g., no access between 10 pm and 6 am), length of time restrictions (e.g., two hours per day), bandwidth limits (e.g., 2 Mb per day), and other rules. The rules may be applied to specific viewers in a household (young child, teenager, guests, parent (no limits)). The rules may be applied based on the identification of a media device such as a child's tablet, a teenager's cell phone, and a parent's smartphone (no limits).

TABLE 1

USAGE RULES

| ID | Rule | | | | |
|---|---|---|---|---|---|
| | Content-based | Time of day | Length of time | Mb limit | ... Rule Z |
| Child's tablet | X | X | X | X | X |
| Teenager CP | X | | X | X | |
| iTV | X | | | | |
| Parent's CP | | | | | |
| Child | X | X | X | X | X |
| Teenager | X | | X | X | |
| Parent | | | | | |
| Guest | X | | | X | |

In an embodiment, a household member (e.g., the parent) may establish the rules by opening a router configuration page or by executing a Web-based application. The rules may apply to any media device that receives media through the router 25, including guests. In another embodiment, an application instantiated on the router 25 and associated with the rules may apply the rules to the household members and the media devices within the home. For example, if the child has a two-hour per day time limit, and has reached that time limit, the application may prevent any further Internet access for the remainder of the day.

In an embodiment, the media devices registered with the router 25 may include thin client software that accesses and communicates with the router 25 to determine any usage controls or restrictions. Thus, in this embodiment, if a media device consults the rules and determines that the time of day restrictions are in effect, the media device will not attempt to access the Internet. In another embodiment, the media devices attempt Internet access, and the router 25 either allows or blocks such access. Furthermore, the media devices may be required to consult the router usage control rules regardless of the location of the media devices. This aspect may prevent access to certain Internet content even when the media device (e.g., a mobile device such as a tablet) is outside the home. For example, a media device outside the home may be directed to the monitor 27 and system 300 when attempting to access the Internet.

In an embodiment, the usage controls and the personal analytics are established by way of an application accessible through a browser. In another embodiment, the usage controls and personal analytics are established through the router's configuration page.

Figure 4A:
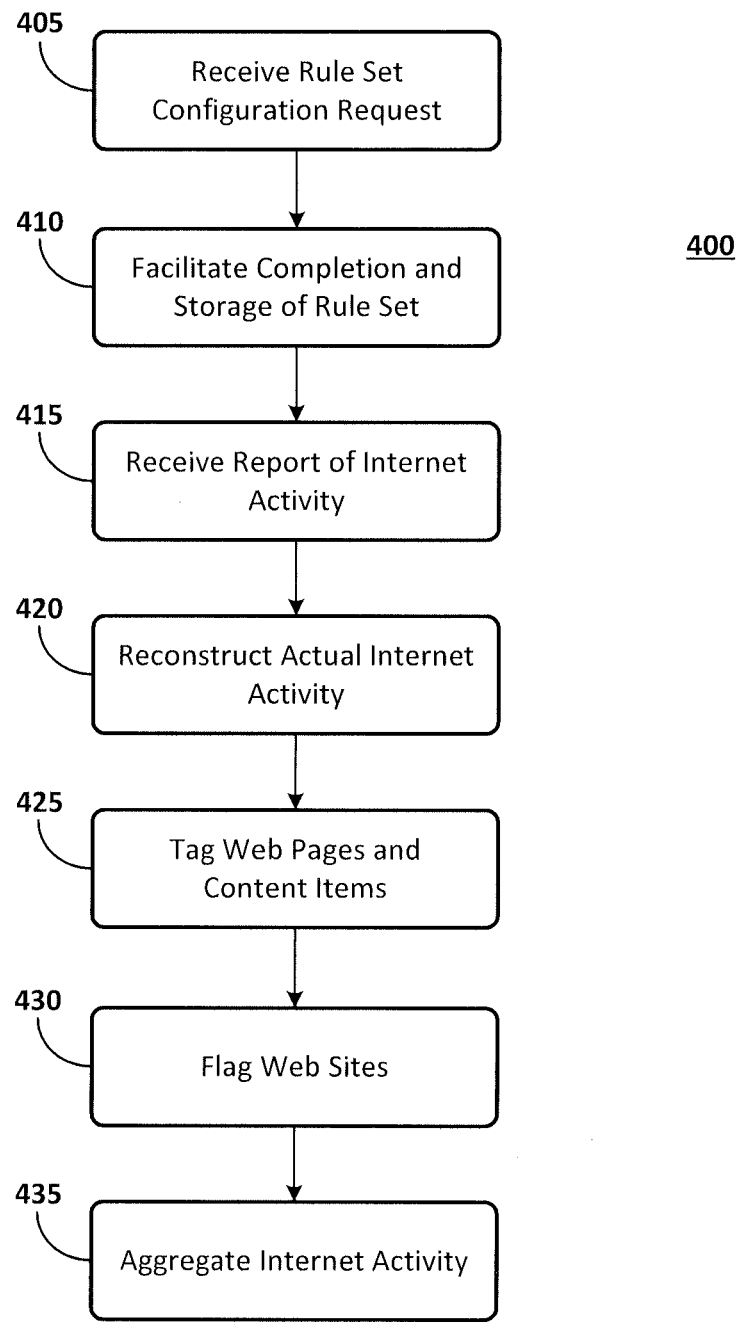
FIGS. 4A-4C illustrate example methods for personal analytics and usage controls.
Figure 4B:
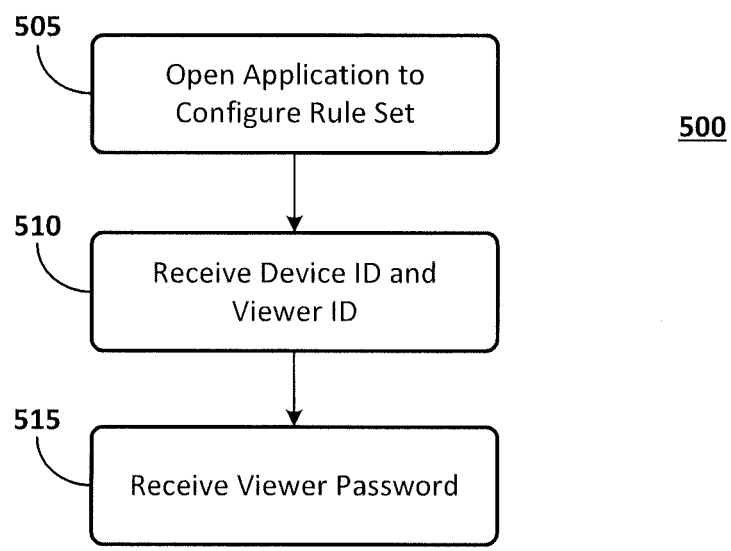
Figure 4C:
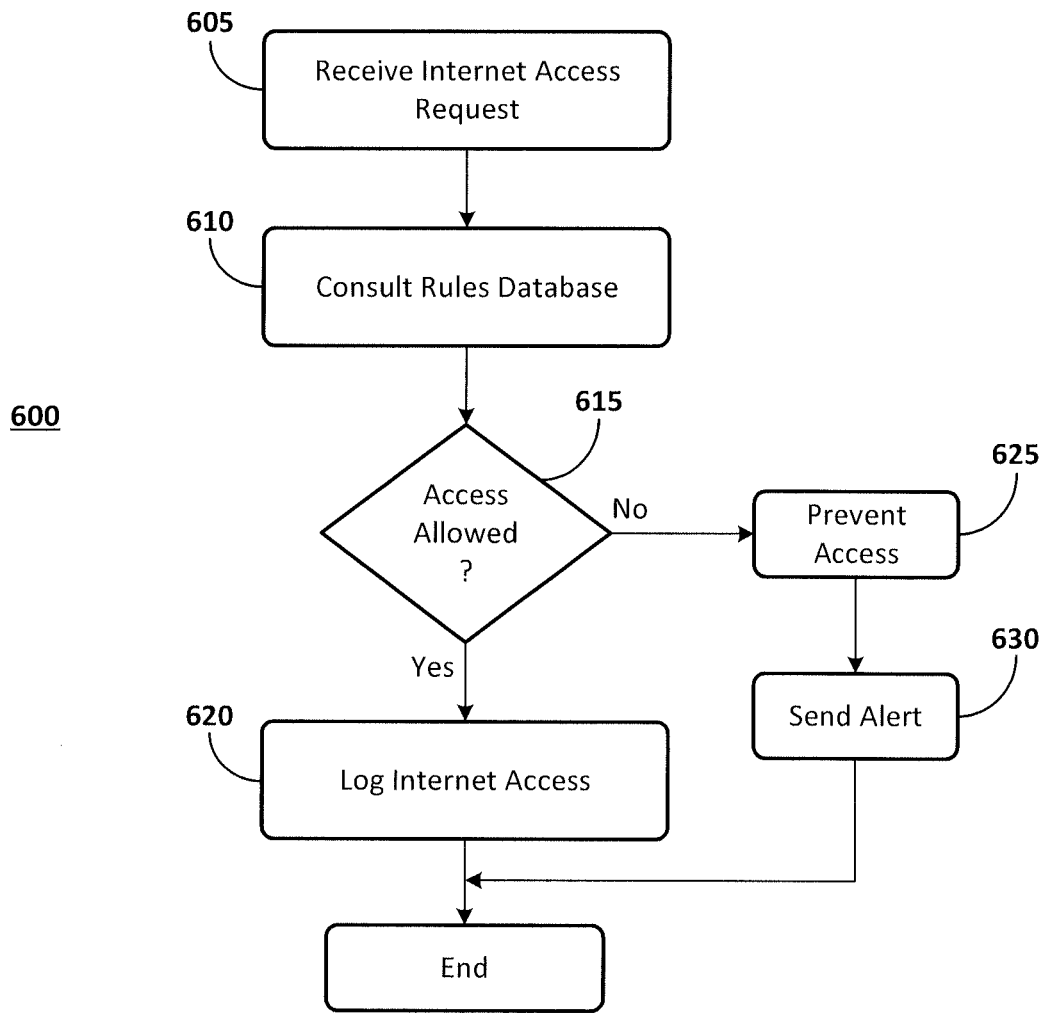

FIGS. 4A-4C illustrate example methods for personal analytics and usage controls. In FIG. 4A, usage control method begins in block 405 when the system 200 receives a request to configure a set of usage rules for a household. In block 410, the system allows a viewer to complete and store a rule set. In an embodiment, the rule set is stored on the router 25.

In block 415, the system 200 receives a report of Internet activity from the router 25. In block 420, the system 200 reconstructs actual Internet usage from the data received from the router 25.

In block 425, the system 200 takes individual Web page views and content accesses and tags them with metadata to enable reporting and usage controls to be applied. In block 430, the system 200 flags potentially malicious Web sites and Web sites having restricted content.

In block 435, the system 200 aggregates the Internet activity usage into a form that is easily consumed by the viewer 22. The method 400 then ends.

FIG. 4B is a flowchart illustrating an example method for creating and enforcing usage controls. In FIG. 4B, method 500 begins in block 505 when a viewer opens an application to configure a rules set for controlling Internet access among viewers 22 and viewer media devices 24 and 26 at viewing location 20. In block 510, the system 300 receives an identification for the media devices 24 and 26, and a user identification for each viewer 22 at the viewing location 20. In block 515, the system 300 receives a password to coincide with each user identification. The method 500 then ends.

FIG. 4C illustrates an alternate method for enforcing usage controls. In FIG. 4C, method 600 begins in block 605 when the system 300 receives an Internet access request from media device 24. In block 610, the system 300 consults rules database 365 and in block 615 determines if Internet access is allowed. If Internet access is allowed, the method 600 moves to block 620. Otherwise, the method moves to block 625. In block 625, the system 300 operates to prevent Internet access. The method 600 then moves to block 30, and the system 300 sends an alert to media device 26. The method 600 then ends.

In block 620, the system 300 logs Internet activity from the media device 24 (including, for example, time spent, addresses of Web sites visited, day and time of access). The method 600 then ends.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 4A-4C. The disclosed devices, components, and systems contemplate using or implementing any suitable technique for performing the steps illustrated. Thus, FIGS. 4A-4C are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A system for controlling and logging media access, comprising:
   a processor of a monitor at a household network; and
   a computer readable storage medium comprising a program of instructions executable by the processor for setting and enforcing usage controls and data logging, wherein when the instructions are executed, the processor:
   provides an interface to establish a rule set and to register media devices with the monitor to centrally control access by the registered media devices associated with the household network, the rule set providing different access rules for each of the media devices;
   receives a first access request transmitted from a first media device associated with the household network from outside the household network, the first access request transmitted by the first media device to the monitor of the household network responsive to the first media device being registered with the monitor via the interface at the monitor;
   determines that the rule set does not permit the first access request by the first media device associated with the household network;
   responsive to determining that the first access request is not permitted, transmits a command to prevent access by the first media device;
   receives a second access request transmitted from a second media device associated with the household network from outside the household network, the second access request transmitted by the first media device to the monitor of the household network responsive to the second media device being registered with the monitor via the interface at the monitor;
   determines that the rule set permits the second access request by the second media device associated with the household network; and
   responsive to determining that the second access request is permitted, transmits an authorization to allow access by the second media device.

2. The system of claim 1, wherein the processor:
   logs activity by each of the media devices associated with the household; and
   generates a report of the activity.

3. The system of claim 1, wherein the processor identifies each of the media devices by a MAC address.

4. The system of claim 1, further comprising a router of the monitor at the household network configured to transmit the command, responsive to determining that the first access request is not permitted.

5. The system of claim 1, wherein each of the media devices comprises a program that consults the rule set to determine whether access is permitted.

6. A system for controlling network access by devices connected to a remote network, comprising:
   a router providing access to a household network, the router comprising one or more processors configured to:
   receive an access request from a client device associated with the household network, the access request transmitted by the client device from outside of the household network to the router responsive to the client device being registered with the router by an interface at the monitor,
   determine that the access request violates a rule set, the rule set established by the interface at the monitor defining access restrictions for the client device, and
   prevent access by the client device, responsive to determining that the access request violates the rule set.

7. The system of claim 6, wherein the router is further configured to determine, responsive to receiving the request from the client device, an identification of the client device based on a MAC address of the client device.

8. The system of claim 6, wherein the router is further configured to identify, responsive to receiving the access request from the client device, an account identifier associated with the client device; and wherein determining that the access request violates the rule set further comprises determining that the access request violates the access restrictions for the account identifier.

9. The system of claim 6, wherein the router is further configured to identify, responsive to receiving the access request from the client device, an device identifier associated with the client device; and wherein determining that the access request violates the rule set further comprises determining that the access request violates the access restrictions for the device identifier.

10. The system of claim 6, wherein the router is further configured to:

determine, responsive to receiving the access request from the client device, that the access request from the client device is to a malicious website, the malicious website identified in a database stored in a memory device of the router; and transmit, by the router, responsive to determining that the access request is to the malicious website, the command to the client device to send the further access requests via the server.

11. The system of claim 6, wherein the router is further configured to transmit, by the router, responsive to determining that the access request violates the rule set, an alert indicator to a central control device, the central control device establishing the rule set.

12. A method of controlling network access by devices connected to a remote network, comprising:

receiving, by a router providing access to a household network, an access request from a client device associated with the household network, the access request transmitted by the client device via a second network outside of the household network to the router responsive to the client device being registered with the router via an interface at the monitor;

determining, by the router, that the access request violates a rule set established by the interface at the monitor defining access restrictions for the client device; and transmitting, by the router, responsive to determining that the access request violates the rule set, a command to prevent access by the client device.

13. The method of claim 12, further comprising:

identifying, by the router, responsive to receiving the access request from the client device, an account identifier associated with the client device; and wherein determining that the access request violates the rule set further comprises determining that the access request violates the access restrictions for the account identifier.

14. The method of claim 12, further comprising:

identifying, by the router, responsive to receiving the access request from the client device, an device identifier associated with the client device; and wherein determining that the access request violates the rule set further comprises determining that the access request violates the access restrictions for the device identifier.

15. The method of claim 12, further comprising:

determining, by the router, responsive to receiving the access request from the client device, that the access request from the client device is to a malicious website, the malicious website identified in a database stored in a memory device of the router; and transmitting, by the router, responsive to determining that the access request is to the malicious website, the command to the client device to send the further access requests via the server.

16. The method of claim 12, further comprising transmitting, by the router, responsive to determining that the access request violates the rule set, an alert indicator to a central control device, the central control device establishing the rule set.

17. A method of controlling and logging media access, comprising:

providing, by a computing system having one or more processors at a household network, an interface to establish a rule set and to register media devices with the monitor to centrally control access by the registered media devices associated with the household network, the rule set providing different access rules for each of the media devices;

receiving, by the computing system, a first access request transmitted from a first media device associated with the household network from outside the household network, the first access request transmitted by the first media device to the computing system responsive to the first media device being registered via the interface at the computing system;

determining, by the computing system, that the rule set does not permit the first access request by the first media device associated with the household network;

responsive to determining that the first access request is not permitted, transmitting, by the computing system, a command to prevent access by the first media device;

receiving, by the computing system, a second access request transmitted from a second media device associated with the household network from a second network location outside the household network, the second access request transmitted by the second media device to the computing system responsive to the second media device being registered with the computing system via the interface at the computing system;

determining, by the computing system, that the rule set permits the second access request by the second media device associated with the household network; and responsive to determining that the second access request is permitted, transmitting, by the computing system, an authorization to allow access by the second media device from outside the household network.

18. The method of claim 17, further comprising:

logging, by the computing system, activity by each of the media devices associated with the household; and generating, by the computing system, a report of the activity.

19. The method of claim 17, further comprising identifying, by the computing system, each of the media devices by a MAC address.

20. The method of claim 17, wherein transmitting the command to prevent access by the media device further comprises transmitting, by a router of the computing system, the command, responsive to determining that the first access request is not permitted.

* * * * *